United States Patent
Horiuchi et al.

(10) Patent No.: US 9,194,999 B2
(45) Date of Patent: Nov. 24, 2015

(54) DISPLAY APPARATUS AND OPTICAL AXIS ADJUSTMENT METHOD THEREOF

(71) Applicant: FUNAI ELECTRIC CO., LTD., Osaka (JP)

(72) Inventors: Hirofumi Horiuchi, Osaka (JP); Akifumi Kono, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 52 days.

(21) Appl. No.: 14/230,379

(22) Filed: Mar. 31, 2014

(65) Prior Publication Data

US 2014/0307464 A1  Oct. 16, 2014

(30) Foreign Application Priority Data

Apr. 11, 2013  (JP) ................. 2013-083366

(51) Int. Cl.
*F21V 7/04*  (2006.01)
*F21V 8/00*  (2006.01)

(52) U.S. Cl.
CPC ............ *G02B 6/0091* (2013.01); *G02B 6/0085* (2013.01)

(58) Field of Classification Search
CPC .. G02B 6/0073; G02B 6/0081; G02B 6/0066; G02B 6/0021; G02B 6/0091
USPC ......................................... 362/602, 632–634
See application file for complete search history.

(56) References Cited

U.S. PATENT DOCUMENTS

| | | | |
|---|---|---|---|
| 7,641,376 B2 * | 1/2010 | Sakai et al. | 362/623 |
| 8,033,708 B2 | 10/2011 | Tsubaki | |
| 8,342,730 B2 | 1/2013 | Tsubaki | |
| 8,545,088 B2 * | 10/2013 | Que et al. | 362/633 |
| 8,696,189 B2 * | 4/2014 | Yu | 362/634 |
| 2007/0008739 A1 * | 1/2007 | Kim et al. | 362/612 |
| 2008/0130315 A1 * | 6/2008 | Song | 362/617 |
| 2009/0237957 A1 | 9/2009 | Tsubaki | |
| 2010/0080019 A1 * | 4/2010 | Iwasaki | 362/628 |
| 2011/0149602 A1 * | 6/2011 | Lee et al. | 362/612 |
| 2011/0304795 A1 * | 12/2011 | Lee et al. | 349/62 |
| 2012/0062816 A1 | 3/2012 | Tsubaki | |
| 2012/0287666 A1 * | 11/2012 | Kwon et al. | 362/602 |

(Continued)

FOREIGN PATENT DOCUMENTS

| | | |
|---|---|---|
| JP | 2004-111402 | 4/2004 |
| JP | 2004-253308 | 9/2004 |

(Continued)

*Primary Examiner* — Robert May
*Assistant Examiner* — Bryon T Gyllstrom
(74) *Attorney, Agent, or Firm* — Wenderoth, Lind & Ponack, L.L.P.

(57) ABSTRACT

A display apparatus includes a liquid crystal panel and a backlight unit that emits light toward the back surface of the liquid crystal panel. The backlight unit includes: an LED; a wiring substrate having the LED mounted thereon; a light guide plate which light from the LED enters through a side surface and exits through a main surface toward the back surface of the liquid crystal panel; and a support component including a first support member that supports the LED and a second support member that supports the light guide plate. The support component is able to move between a first position at which the first support member supports the LED and the second support member supports the light guide plate and a second position at which the first support member is apart from the LED and the second support member supports the light guide plate.

7 Claims, 14 Drawing Sheets

(56) References Cited

U.S. PATENT DOCUMENTS

2013/0135898 A1* 5/2013 Horikawa et al. ............. 362/609
2014/0218618 A1* 8/2014 Sasaoka et al. ............... 348/725
2015/0009710 A1* 1/2015 Kim et al. .................... 362/611

FOREIGN PATENT DOCUMENTS

| JP | 2005-10406 | 1/2005 |
| JP | 2009-163917 | 7/2009 |
| JP | 2009-224301 | 10/2009 |

* cited by examiner

DISPLAY APPARATUS AND OPTICAL AXIS ADJUSTMENT METHOD THEREOF

CROSS REFERENCE TO RELATED APPLICATION

The present application is based on and claims priority of Japanese Patent Application No. 2013-083366 filed on Apr. 11, 2013. The entire disclosure of the above-identified application, including the specification, drawings and claims is incorporated herein by reference in its entirety.

FIELD

The present invention relates to a display apparatus for displaying images and an optical axis adjustment method thereof.

BACKGROUND

Conventional display apparatuses include those equipped with edge-lit backlight units which shine light toward the back surface of the display panel, such as those found in liquid crystal television receivers for example (for example, see Patent Literature (PTL) 1).

FIG. 13 is a cross section illustrating relevant components in a conventional display apparatus equipped with an edge-lit backlight unit. The display apparatus 100 shown in FIG. 13 is provided with an edge-lit backlight unit 104 behind the display panel 102. The backlight unit 104 includes a plurality of light emitting diodes (LEDs) 106, a wiring substrate 108, a heat sink 110, and a light guide plate 112. The LEDs 106 are mounted spaced apart from each other on the wiring substrate 108. The heat sink 110 includes a heat dissipation portion 116 supported by a rear cabinet 114 and an attachment portion 118 which extends from one end of the heat dissipation portion 116 toward the display panel 102. A support component 120 for supporting the light guide plate 112 is attached to the heat dissipation portion 116. The wiring substrate 108 is attached to the attachment portion 118. Each of the LEDs 106 faces the side surface of the light guide plate 112.

In the above-described conventional display apparatus 100, positioning of the light guide plate 112 in the Z axis direction is determined by the contact surface thereof with the support component 120 such that the optical axis C1 of each of the LEDs 106 and the optical axis C2 of the light guide plate 112 are aligned.

CITATION LIST

Patent Literature

[PTL 1] Japanese Unexamined Patent Application Publication No. 2009-163917

SUMMARY

Technical Problem

However, with the conventional display apparatus 100 illustrated in FIG. 13, there is a problem that the optical axis C1 and the optical axis C2 can easily become misaligned as a result of, for example, dimensional irregularities of the support component 120 in the Z axis direction or misalignment of the mounting position of the LEDs 106 in the Z axis direction. If the misalignment between the optical axis C1 and the optical axis C2 becomes too large, the central luminance of the display panel 102 greatly decreases.

A structure such as the one illustrated in FIG. 14 is a conceivable solution to the above problem. FIG. 14 is a cross section illustrating relevant components in the display apparatus according to the comparative example equipped with an edge-lit backlight unit. In a display apparatus 200 illustrated in FIG. 14, both the LEDs 106 and the light guide plate 112 are supported by the same support component 220 attached to the heat dissipation portion 116. With this, positioning of the LEDs 106 and the light guide plate 112 in the Z axis direction is determined by the contact surfaces thereof with the support component 220 so as to align the optical axis C1 of each of the LEDs 106 and the optical axis C2 of the light guide plate 112. This makes it possible to minimize misalignment of the optical axes C1 and C2 since the dimensional irregularities or mounting position misalignment described above are resolved.

However, the following problem exists with the display apparatus 200 according to the comparative example illustrated in FIG. 14. The LEDs 106 are mounted and soldered on the wiring substrate 108. As such, since the LEDs 106 are maintained in a state in which the side surfaces thereof are supported by the support component 220, the soldered portion 222 is easily subject to shear stress, causing concern that the dependability of the solder connection will decrease.

The present invention aims to solve the above-described problem and provide a display apparatus and optical axis adjustment method thereof capable of minimizing a misalignment of the optical axis of the light source and the optical axis of light guide plate as well as increasing the dependability of the solder connection between the light source and the wiring substrate.

Solution to Problem

In order to achieve the above goal, the display apparatus according to an aspect of the present invention includes: a display panel; and a backlight unit that emits light toward a back surface of the display panel, wherein the backlight unit includes: a light source that generates the light; a wiring substrate having the light source mounted thereon; a light guide plate including a side surface through which the light generated by the light source enters and a main surface through which the light entering through the side surface exits toward the back surface of the display panel; and a support component including a first support member that supports the light source to position an optical axis of the light source and a second support member that supports the light guide plate to position an optical axis of the light guide plate, and the support component is able to move between (i) a first position at which the first support member supports the light source and the second support member supports the light guide plate and (ii) a second position at which the first support member is apart from the light source and the second support member supports the light guide plate.

According to this aspect, when the support component is positioned at the first position, the first support member supports the light source. When the support component is at the first position or the second position, the second support member supports the light guide plate. Since both the light source and the light guide plate are supported by the support component, it is possible to position the optical axis of the light source and position the optical axis of the light guide plate so as to align the optical axis of the light source and the optical axis of the light guide plate. This makes it possible to minimize misalignment of the optical axes of the light source and the light guide plate. Furthermore, after the positioning of the optical axis of the light source is complete, the support component is moved from the first position to the second position whereby the first support member is separated from the light source. This makes it possible to minimize the shear stress on the soldered portion between the light source and the wiring substrate and increase the dependability of the solder connection.

For example, in the display apparatus according to an aspect of the present invention, the light source may include a plurality of light sources, the light sources may be arranged spaced apart from each other in a lengthwise direction of the wiring substrate, the first support member may include a plurality of first support members, each corresponding to a different one of the light sources, the support component may be able to move between the first position and the second position in a direction substantially parallel to an arrangement direction of the light sources, and each of the first support members may be positioned between two adjacent ones of the light sources when the support component is at the second position.

According to this aspect, it is possible to configure the moving direction of the support component to be a direction substantially parallel to the arrangement direction of the light sources.

For example, in the display apparatus according to an aspect of the present invention, an end surface of each of the first support members that faces the wiring substrate may be a convex surface.

According to this aspect, since the surface of each of the first support members that faces the wiring substrate is a convex surface, the contact surface area of the first support member and the light source is relatively small. This in turn makes it possible to minimize the frictional force acting between the light source and the first support member when the support component is moved from the first position to the second position. As a result, it is possible to minimize the shear stress on the soldered portion between the light source and the wiring substrate resulting from the frictional force.

For example, in the display apparatus according to an aspect of the present invention, a reflective surface that reflects the light may be formed on a surface of each of the first support members that supports the light source.

According to this aspect, since a reflective surface that reflects light is formed on a surface of each of the first support members that supports the light source, a portion of the light from the light source enters the side surface of the light guide plate after being reflected by the reflective surface. This makes it possible to minimize a decrease in luminance between two adjacent light sources. As a result, it is possible to minimize hot spots (phenomenon in which the luminance of the display panel is greater in some areas than others) from occurring on the display panel.

For example, in the display apparatus according to an aspect of the present invention, the light source may include a plurality of light sources, the light sources may be arranged spaced apart from each other in a lengthwise direction of the wiring substrate, the first support member may be a portion of the support component that is an end portion toward the light sources, the second support member may be a portion of the support component that is an end portion toward the light guide plate, and the support component may be able to move between the first position and the second position in a direction substantially perpendicular to an arrangement direction of the light sources.

According to this aspect, it is possible to configure the moving direction of the support component to be a direction substantially perpendicular to the arrangement direction of the light sources.

For example, in the display apparatus according to an aspect of the present invention, at least a portion of an edge portion of a surface of the first support member that supports the light source may be chamfered or rounded.

According to this aspect, since at least an edge portion of a surface of the first support member that supports the light source is chamfered or rounded, it is possible to minimize contact between the edge portion and the soldered portion of the light source and the wiring substrate.

The optical axis adjustment method according to an aspect of the present invention for the display apparatus including: a display panel; and a backlight unit that emits light toward a back surface of the display panel, the backlight unit including: a light source that generates the light; a wiring substrate having the light source mounted thereon; and a light guide plate including a side surface through which the light generated by the light source enters and a main surface through which the light entering through the side surface exits toward the back surface of the display panel, the optical axis adjustment method comprising: positioning, at a first position, a support component including a first support member and a second support member; positioning an optical axis of the light source by supporting the light source with the first support member while the support component is at the first position; moving the support component from the first position to a second position different from the first position to separate the first support member from the light source; and positioning an optical axis of the light guide plate by supporting the light guide plate with the second support member while the support component is at the first position or the second position.

According to this aspect, the light source is supported by the first support member while the support component is positioned at the first position. Moreover, the light guide plate is supported by the second support member while the support component is at the first position or the second position. Since both the light source and the light guide plate are supported by the support component, it is possible to position the optical axes of the light source and the light guide plate so as to align these optical axes. This makes it possible to minimize misalignment of the optical axes of the light source and the light guide plate. Furthermore, after the positioning of the optical axis of the light source is complete, the support component is moved from the first position to the second position whereby the first support member is separated from the light source. This makes it possible to minimize the shear stress on the soldered portion between the light source and the wiring substrate and increase the dependability of the solder connection.

Advantageous Effects

With the display apparatus and the optical axis adjustment method thereof according to an aspect of the present invention, it is possible to minimize misalignment of the optical axis of the light source and the optical axis of light guide plate as well as increase the dependability of the solder connection between the light source and the wiring substrate.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Hereinafter, exemplary embodiments are described in greater detail with reference to the accompanying Drawings. It should be noted that the embodiments described below show specific, preferred examples of the present invention. The numerical values, shapes, materials, structural elements, the arrangement and connection of the structural elements, steps, order of the steps etc. shown in the following embodiments are mere examples, and therefore do not limit the present invention, the scope of which is defined in the appended Claims. As such, among the structural elements in the following embodiments, structural elements not recited in any one of the independent claims are described as preferred structural elements, and are not absolutely necessary to overcome the problem according to the present invention.

Embodiment 1

Display Apparatus General Structure

Figure 1:
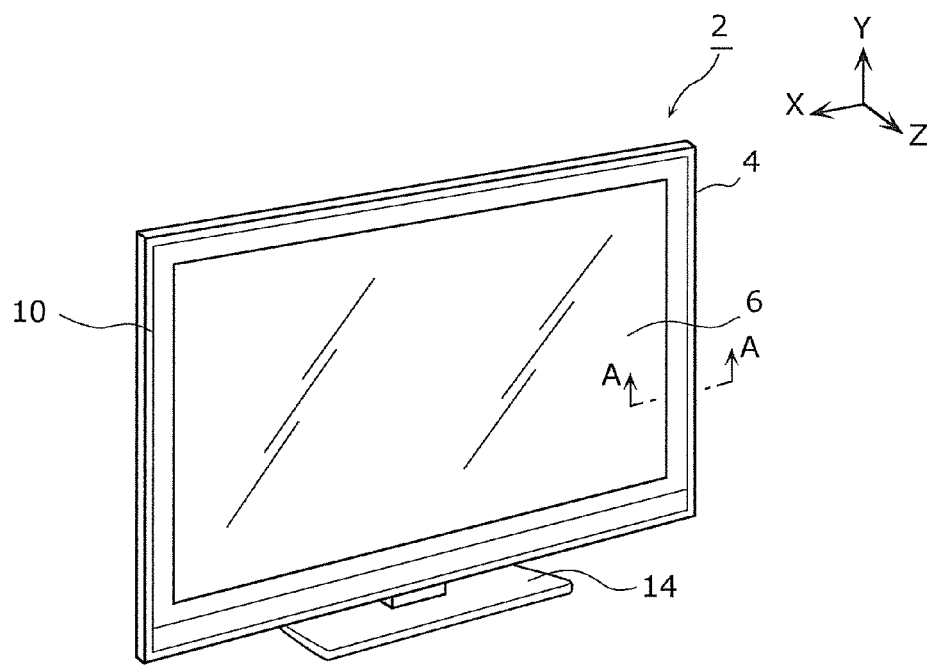
FIG. 1 is a perspective view of the front of the display apparatus according to Embodiment 1 of the present invention.
Figure 2:
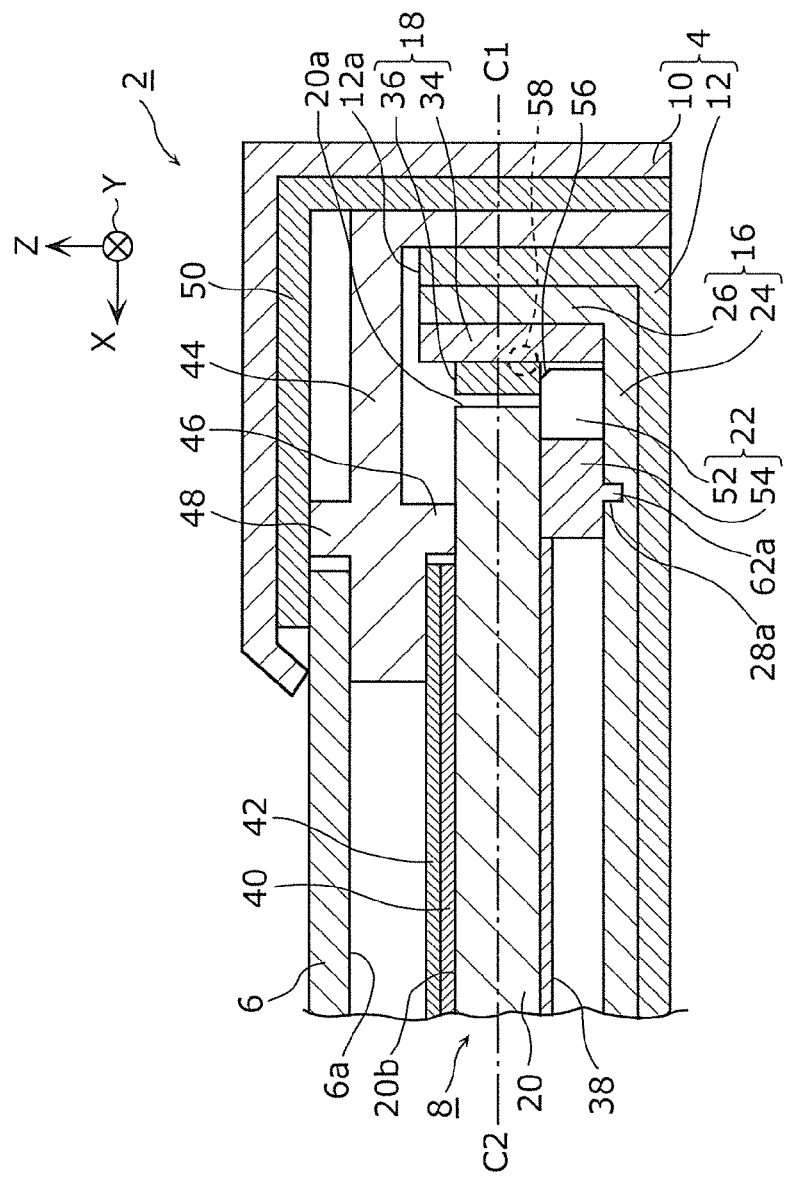
FIG. 2 is a cross section illustrating relevant components in the display apparatus at the line A-A illustrated in FIG. 1, while the support component is positioned at the second position.
Figure 3:
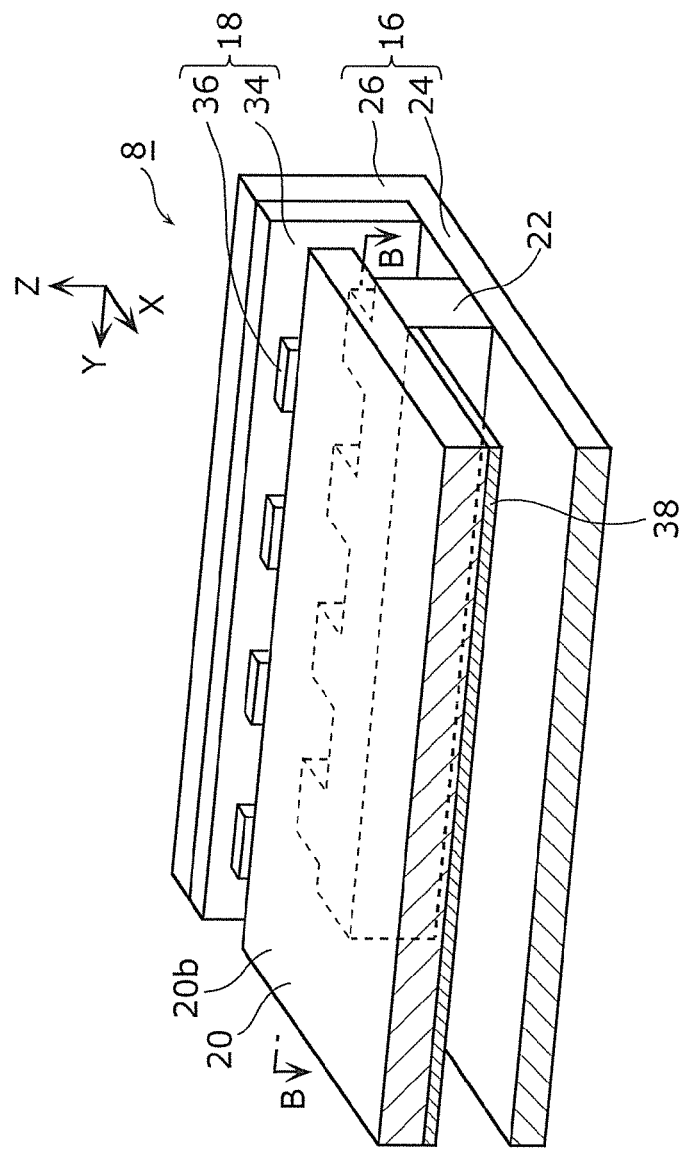
FIG. 3 is a perspective view of relevant components of the backlight unit illustrated in FIG. 2.
Figure 4:
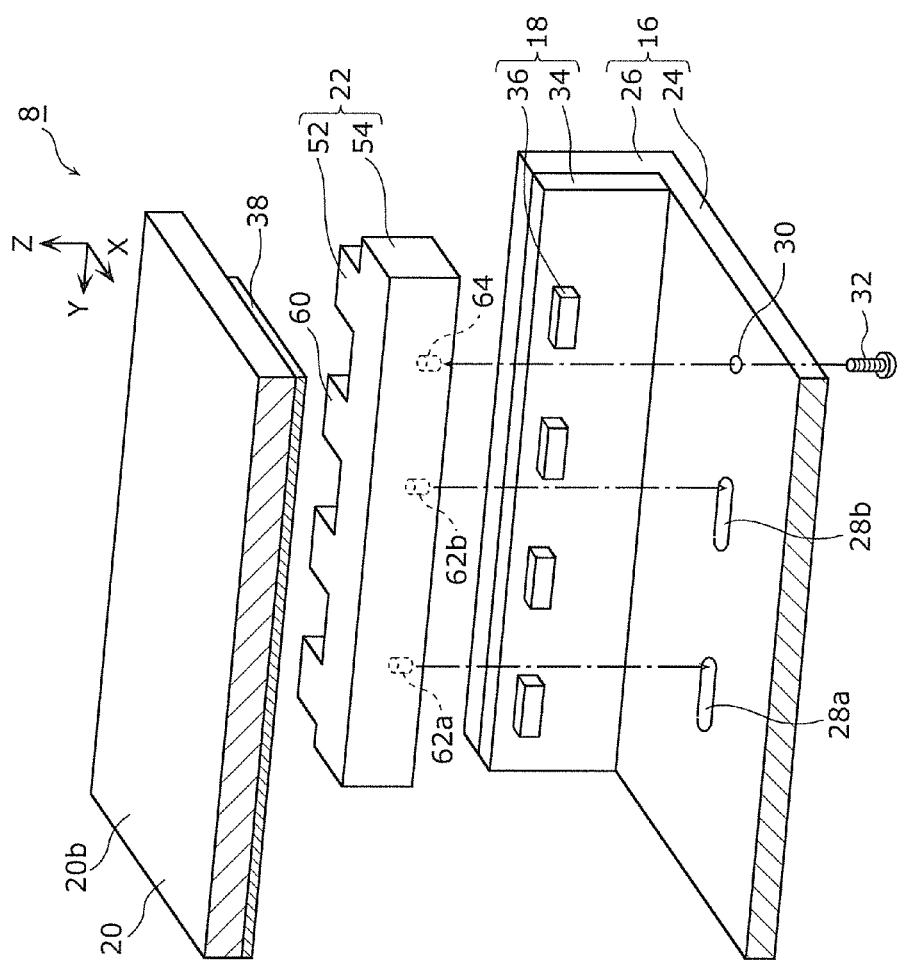
FIG. 4 is a partially exploded perspective view of relevant components of the backlight unit illustrated in FIG. 2.
Figure 5:
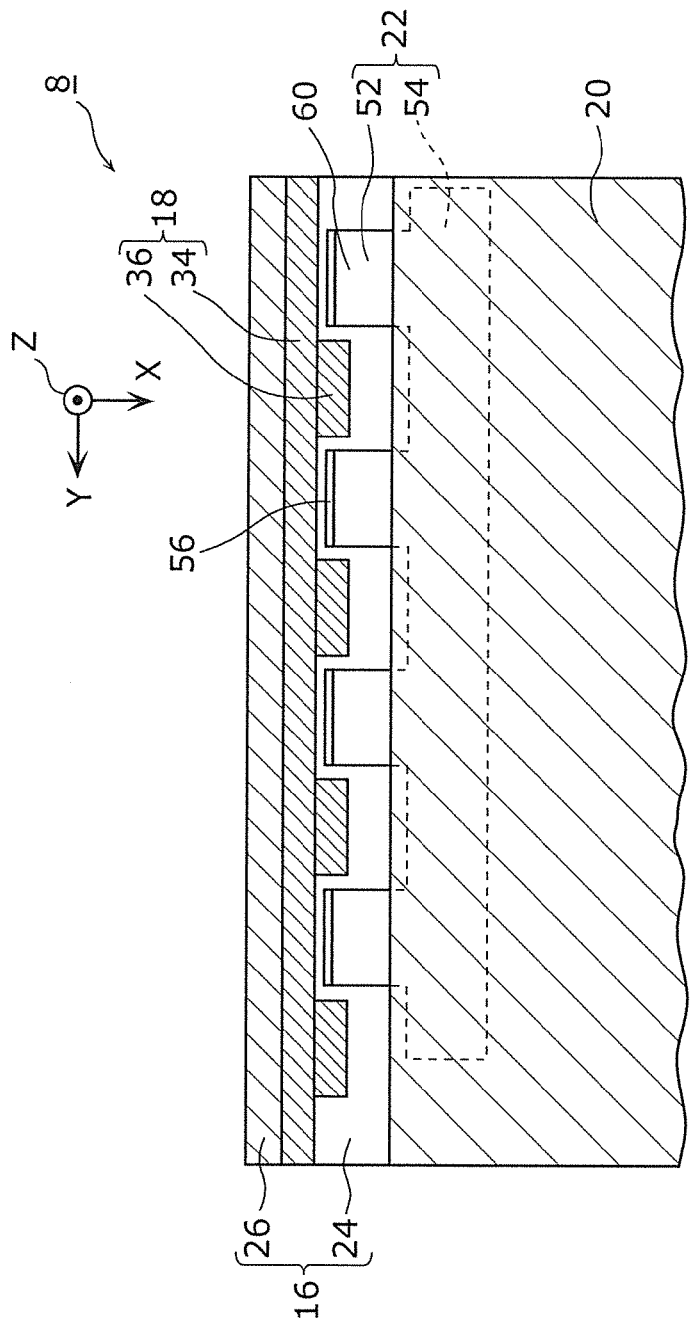
FIG. 5 is a cross section illustrating relevant components of the backlight unit at the line B-B illustrated in FIG. 3, while the support component is positioned at the second position.
Figure 6:
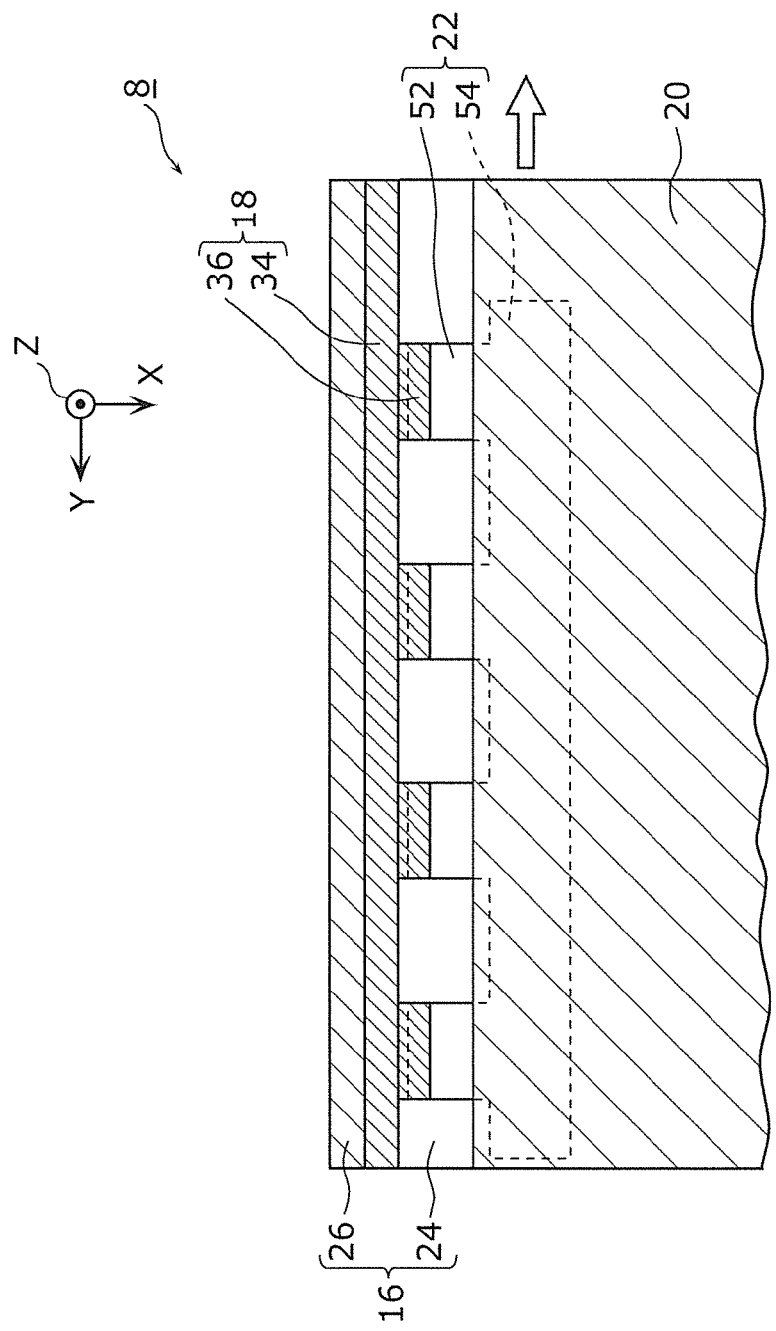
FIG. 6 is a cross section illustrating relevant components of the backlight unit at the line B-B illustrated in FIG. 3, while the support component is positioned at the first position.
Figure 7:
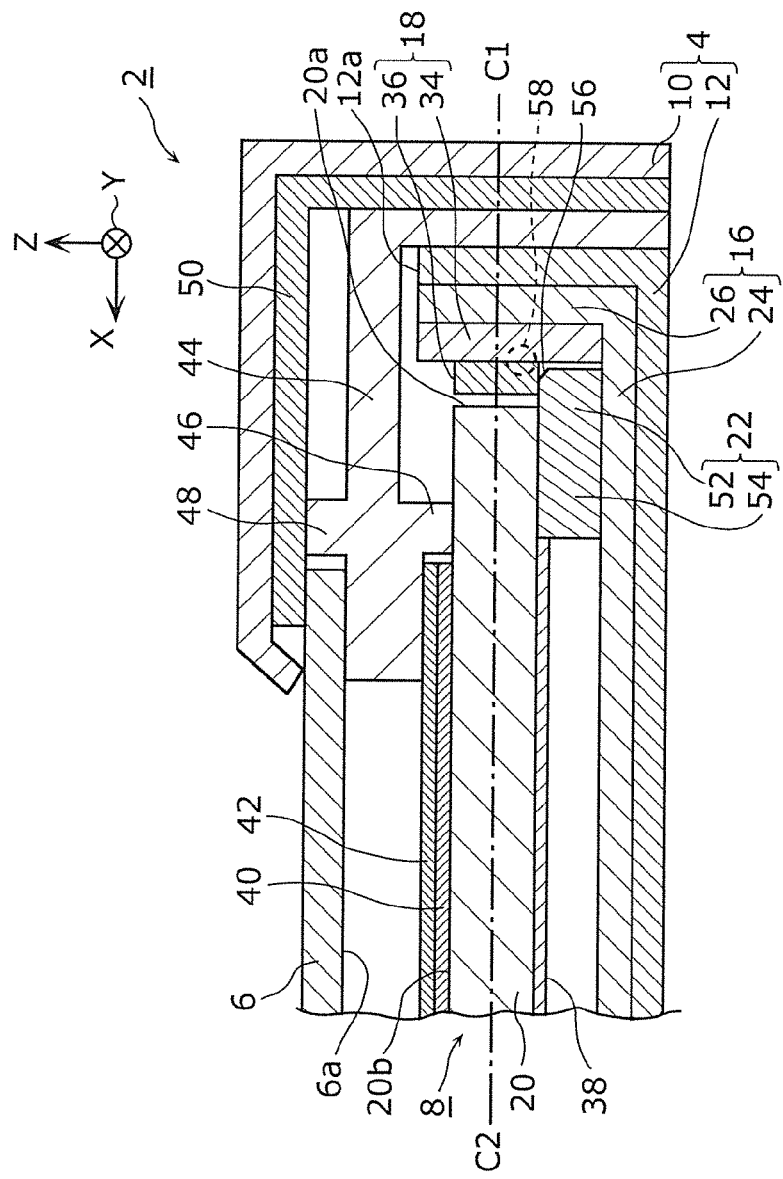
FIG. 7 is a cross section illustrating relevant components in the display apparatus at the line A-A illustrated in FIG. 1, while the support component is positioned at the first position.

First, the structure of the display apparatus according to Embodiment 1 will be described with reference to FIG. 1 through FIG. 7. FIG. 1 is a perspective view of the display apparatus according to Embodiment 1 of the present invention. FIG. 2 is a cross section illustrating relevant components in the display apparatus at the line A-A illustrated in FIG. 1, while the support component is positioned at the second position. FIG. 3 is a perspective view illustrating relevant components of the backlight unit illustrated in FIG. 2. FIG. 4 is a partially exploded perspective view of relevant components of the backlight unit illustrated in FIG. 2. FIG. 5 is a cross section illustrating relevant components of the backlight unit at the line B-B illustrated in FIG. 3, while the support component is positioned at the second position. FIG. 6 is a cross section illustrating relevant components of the backlight unit at the line B-B illustrated in FIG. 3, while the support component is positioned at the first position. FIG. 7 is a cross section illustrating relevant components in the display apparatus at the line A-A illustrated in FIG. 1, while the support component is positioned at the first position.

As is illustrated in FIG. 1 and FIG. 2, the display apparatus 2 includes a housing 4, a liquid crystal panel 6 (which constitutes the display panel) provided in the housing 4, and a backlight unit 8 provided in the housing 4. It should be noted that the display apparatus 2 according to Embodiment 1 is a liquid crystal television receiver equipped with the edge-lit backlight unit 8.

A front cabinet 10 and a rear cabinet 12 are put together to form the housing 4. The front cabinet 10 is formed in the shape of a frame and covers the outer peripheral portion of the liquid crystal panel 6. The rear cabinet 12 is arranged facing the back surface 6a of the liquid crystal panel 6. The rear cabinet 12 includes a rectangular opening 12a to accommodate the liquid crystal panel 6. A stand 14 for supporting the housing 4 from below is attached to the rear cabinet 12.

As is illustrated in FIG. 2 through FIG. 4, the backlight unit 8 includes a heat sink 16, an LED bar 18, a light guide plate 20, and a support component 22.

The heat sink 16 includes a flat heat dissipation portion 24 and an attachment portion 26 which extends substantially vertical from one end portion of the heat dissipation portion 24 toward the liquid crystal panel 6. In other words, the heat sink 16 has a cross section that is substantially L-shaped. The heat dissipation portion 24 is attached to the internal surface side of the rear cabinet 12 with screws (not shown in the drawings). As is illustrated in FIG. 2 and FIG. 4, a pair of slots 28a and 28b is provided in the surface of the heat dissipation portion 24 on the light guide plate 20 side. Each of the slots 28a and 28b extends in a straight line and substantially parallel to the arrangement direction (the Y axis direction) of the plurality of LEDs 36 (to be described later). A pair of protrusions 62a and 62b (to be described later) provided on the support component 22 fit into and are freely movable in the slots 28a and 28b, respectively. A through-hole 30 is also formed in the heat dissipation portion 24. A screw 32 is inserted through the through-hole 30 to fasten the support component 22 to the heat dissipation portion 24. It should be noted that the heat sink 16 is made from a metal having high thermal conductivity, such as aluminum.

The LED bar 18 includes a wiring substrate 34 and a plurality of LEDs 36 mounted on and soldered to the wiring substrate 34 (each LED 36 constitutes a light source). The wiring substrate 34 has an elongated plate-like shape and is attached to the attachment portion 26 of the heat sink 16 with thermally conductive double sided tape (not shown in the drawings). It should be noted that the wiring substrate 34 is made from a metal having high thermal conductivity, such as aluminum. The LEDs 36 are arranged in a line in the lengthwise direction of the wiring substrate 34 and spaced apart from each other. It should be noted that each of the LEDs 36 is, for example, a chip-type LED.

The light guide plate 20 is supported by the support component 22 that is movably attached to the heat dissipation portion 24. The configuration of the support component 22 will be described later. A reflective sheet 38 for reflecting light is attached to the back surface of the light guide plate 20. A side surface 20a of the light guide plate 20 faces the LEDs 36. A main surface 20b of the light guide plate 20 (the surface on the opposite side of the back surface) faces the back surface 6a of the liquid crystal panel 6.

A diffusion sheet 40 and a lens sheet 42 are layered and attached to the main surface 20b of the light guide plate 20. The diffusion sheet 40 is an optical sheet for diffusing light emitted from the main surface 20b of the light guide plate 20. The lens sheet 42 is an optical sheet for guiding the light diffused by the diffusion sheet 40 to the back surface 6a of the liquid crystal panel 6.

The LEDs 36 light up and the light therefrom enters the light guide plate 20 through the side surface 20a. The light entering through the side surface 20a of the light guide plate 20 propagates into the light guide plate 20, reflects off the reflective sheet 38, and then is emitted from the main surface 20b. After passing through the diffusion sheet 40 and the lens sheet 42, the light emitted from the main surface 20b enters the liquid crystal panel 6 through the back surface 6a. An image is displayed on the liquid crystal panel 6 as a result of the light shining on the back surface 6a of the liquid crystal panel 6.

It should be noted that the LEDs 36 generate heat when they light up. The heat from the LEDs 36 is transferred to the heat dissipation portion 24 via the wiring substrate 34, the double sided tape, and the attachment portion 26. The heat transferred to the heat dissipation portion 24 dissipates to the air.

As is illustrated in FIG. 2, a guide member 44 for supporting the outer peripheral portion of the liquid crystal panel 6 from the back surface 6a side thereof is arranged at an opening 12a of the rear cabinet 12. The guide member 44 is, for example, formed in the shape of a frame. A first rib 46 is provided on the surface of the guide member 44 on the rear cabinet 12 side, and a second rib 48 is provided on the surface of the guide member 44 on the liquid crystal panel 6 side. The first rib 46 protrudes toward the rear cabinet 12 and the second rib 48 protrudes toward the liquid crystal panel 6. The first rib 46 is for securing a gap between the light guide plate 20 and the guide member 44 that is the size of the cumulative thickness of the diffusion sheet 40 and the lens sheet 42. This sandwiches and holds the outer peripheral portions of the diffusion sheet 40 and the lens sheet 42 between the guide member 44 and the light guide plate 20. The second rib 48 is for securing a gap between the guide member 44 and a bezel 50 (to be described later) that is the size of the thickness of the liquid crystal panel 6.

The outer peripheral portion of the rectangular liquid crystal panel 6 is supported by the inner peripheral portion (the portion of the guide member 44 inward relative to the second rib 48) of the guide member 44. The outer peripheral portion of the liquid crystal panel 6 is covered by the bezel 50. The bezel 50 is, for example, formed in the shape of a frame, and is secured to the guide member 44 with screws (not shown in the drawings). This sandwiches and holds the outer peripheral portion of the liquid crystal panel 6 between the bezel 50 and the guide member 44.

It should be noted that the front cabinet 10 is attached to the rear cabinet 12 with screws (not shown in the drawings) to cover the bezel 50 and the guide member 44.

(Display Apparatus Characteristic Structure)

Next, the support component 22, which is a characteristic structure of the display apparatus 2 according to Embodiment 1, will be discussed in detail. As is shown in FIG. 2 through FIG. 4, the support component 22 is movably attached to the heat dissipation portion 24. The support component 22 includes a plurality of first support members 52 and a second support member 54. Each of the first support members 52 is for positioning an optical axis C1 of a corresponding one of the LEDs 36 in the Z axis direction (the thickness direction of the display apparatus 2) by supporting a side surface of the corresponding LED 36. The second support member 54 is for positioning an optical axis C2 of the light guide plate 20 in the Z axis direction by supporting an end portion of the light guide plate 20 near the LED bar 18. It should be noted that the remainder of the end portion of the light guide plate 20 is supported by a support pad (not shown in the drawings) connected to the heat dissipation portion 24 and having the same height as the height of the support component 22 in the Z axis direction.

The second support member 54 has an elongated plate-like shape that extends in the Y axis direction. Each of the first support members 52 extend from a side surface of the second support member 54 toward the LED bar 18. The first support members 52 are spaced apart from each other at lengths corresponding to the gaps between the LEDs 36. It should be noted that the Y axis length of each of the first support members 52 is no greater than the distance between two adjacent LEDs 36.

In Embodiment 1, an end surface of each of the first support members 52 that faces the wiring substrate 34 has a flat surface. The portion of an edge portion 56 of a surface of each of the first support members 52 that supports the LED 36 that is closest to a soldered portion 58 of the wiring substrate 34 and the LED 36 is chamfered. This makes it possible to minimize contact between the edge portion 56 and the soldered portion 58.

It should be noted that the first support members 52 and the second support member 54 have the same height in the Z axis direction. Moreover, the height is set to a height that aligns the optical axis C1 and the optical axis C2 when the LEDs 36 are supported by the first support member 52 and the light guide plate 20 is supported by the second support member 54.

The first support members 52 and the second support member 54 are integrally formed from resin. It should be noted that the support component 22 is made from a resin with a relatively high reflectivity, such as a white polycarbonate. With this, a reflective surface 60 that reflects light is formed on a surface of each the first support members 52 that supports a corresponding one of the LEDs 36.

As is illustrated in FIG. 2 and FIG. 4, a pair of protrusions 62a and 62b is formed on the surface of the second support member 54 facing the heat dissipation portion 24. The pair of protrusions 62a and 62b fit into and are freely movable in the slots 28a and 28b formed in the heat dissipation portion 24, respectively. The pair of protrusions 62a and 62b are able to move along the length of the pair of slots 28a and 28b. This allows the support component 22 to slide in a straight line between the first position and the second position in a direction substantially parallel to the arrangement direction of the LEDs 36 (in other words, in the Y axis direction). In other words, the pair of slots 28a and 28b and the pair of protrusions 62a and 62b constitute a moving mechanism which allows the support component 22 to slide in the manner described above.

When the display apparatus 2 is in its finalized state (finished product), the support component 22 is positioned at the second position, as FIG. 2 and FIG. 5 illustrate. When the support component 22 is positioned at the second position, the first support members 52 are apart from the LEDs 36 and the second support member 54 supports the light guide plate 20. It should be noted that in Embodiment 1, the state in which the first support members 52 are apart from the LEDs 36 is a state in which each of the first support members 52 are positioned between two adjacent ones of the LEDs 36, as FIG. 5 illustrates. With this, since a portion of the light from the LEDs 36 is reflected by the reflective surface 60 and enters the light guide plate 20 through the side surface 20a, it is possible to minimize a decrease in luminance between two adjacent LEDs 36 in the luminance distribution of the light from the LEDs 36 in the Y axis direction. This makes it possible to minimize hot spots (phenomenon in which the luminance of the liquid crystal panel 6 is greater in some areas than others) from occurring on the liquid crystal panel 6.

On the other hand, while the display apparatus 2 is still being produced, such as during the optical axis adjustment manufacturing process (to be described later), the support component 22 is positioned at the first position, as FIG. 6 and FIG. 7 illustrate. When the support component 22 is positioned at the first position, the first support members 52 support the LEDs 36 and the second support member 54 supports the light guide plate 20.

It should be noted that when the support component 22 slides from the first position to the second position, the first support members 52 remain in contact with the LEDs 36 while moving in the Y axis direction.

The surface of the second support member 54 facing the heat dissipation portion 24 further includes a screw hole 64 for tightening the screw 32. The screw 32 passes through the through-hole 30 and locks with the screw hole 64 to secure the support component 22 to the heat dissipation portion 24 while the support component 22 is at the second position.

(Optical Axis Adjustment Method for Display Apparatus)

Figure 8:
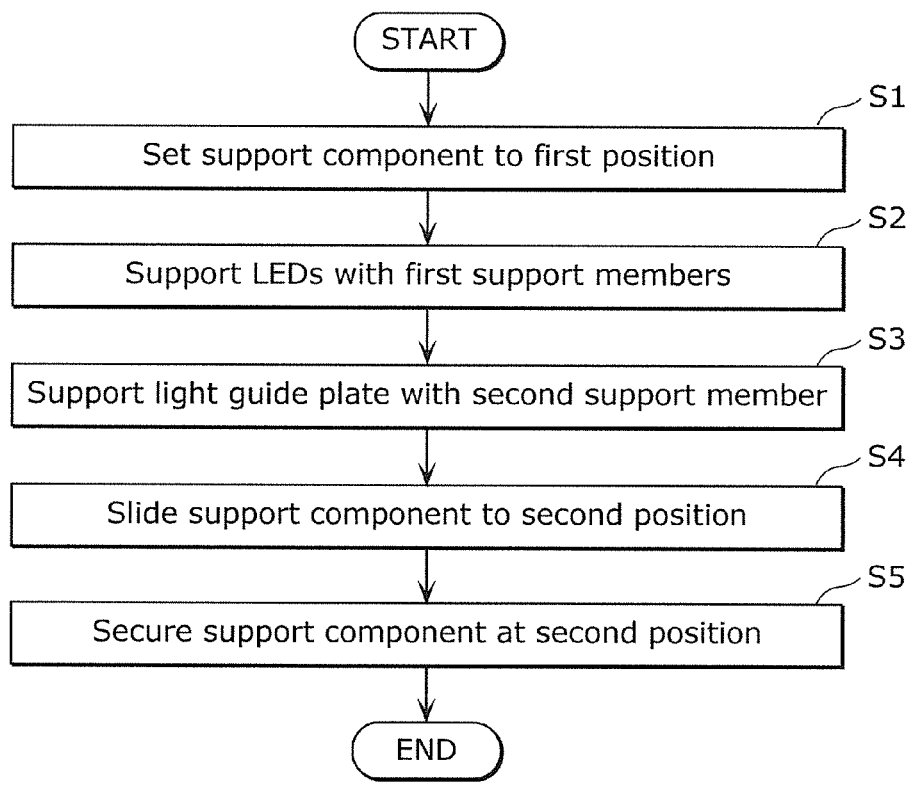
FIG. 8 is a flow chart illustrating the optical axis adjustment method for the display apparatus according to Embodiment 1 of the present invention.

Next, the optical axis adjustment method for the display apparatus 2 according to Embodiment 1 will be described with reference to FIG. 8. FIG. 8 is a flow chart illustrating the optical axis adjustment method for the display apparatus 2 according to Embodiment 1 of the present invention. This optical axis adjustment method is used, for example, during an optical axis adjustment manufacturing process in the production of the display apparatus 2. In this optical axis adjustment manufacturing process, positioning of the optical axis C1 of each LED 36 and the optical axis C2 of the light guide plate 20 in the Z axis direction is determined so as to align the optical axis C1 and the optical axis C2.

First, before the LED bar 18 and the light guide plate 20 are attached to the heat sink 16, the support component 22 is set to the first position, as is illustrated in FIG. 6 and FIG. 7 (S1). Next, the side surfaces of the LEDs 36 are supported by the first support members 52 (S2), and the wiring substrate 34 is attached to the attachment portion 26 via double sided tape. This determines the positioning of the optical axis C1 of each LED 36 in the Z axis direction.

Next, the light guide plate 20 is supported by the second support member 54 while the support component 22 is at the first position (S3). This determines the positioning of the optical axis C2 of the light guide plate 20 such that the optical axis C2 and the optical axis C1 of each LED 36 are aligned in the Z axis direction. Next, the support component 22 is slid from the first position to the second position (S4). This separates the first support members 52 from the LEDs 36 and positions each of the first support members 52 between two adjacent LEDs 36. Then, the screw 32 is placed through the through-hole 30 and interlocked with the screw hole 64 to secure the support component 22 to the heat dissipation portion 24 while the support component 22 is at the second position (S5).

It should be noted that in Embodiment 1, the support component 22 is slid from the first position to the second position after the light guide plate 20 is supported by the second support member 54, but conversely the light guide plate 20 may be supported by the second support member 54 after the support component 22 is slid from the first position to the second position.

Advantageous Effect

Next, the advantageous effect achieved by the display apparatus 2 and the optical axis adjustment method for the display apparatus 2 according to Embodiment 1 will be discussed. The LEDs 36 are supported by the first support member 52 while the support component 22 is at the first position. Moreover, the light guide plate 20 is supported by the second support member 54 while the support component 22 is at the first position or the second position. In this way, since both the LEDs 36 and the light guide plate 20 are supported by the same support component 22, positioning of the optical axis C1 of each LED 36 and the optical axis C2 of the light guide plate 20 in the Z axis direction is determined so as to align the optical axis C1 and the optical axis C2. This makes it possible to minimize misalignment of the optical axes C1 and C2.

After the above-described positioning is completed, the support component 22 is slid from the first position to the second position whereby the first support member 52 is separated from the LEDs 36. This makes it possible to minimize the shear stress on the soldered portion 58 between the LEDs 36 and the wiring substrate 34 and increase the dependability of the solder connection.

Embodiment 2

Figure 9:
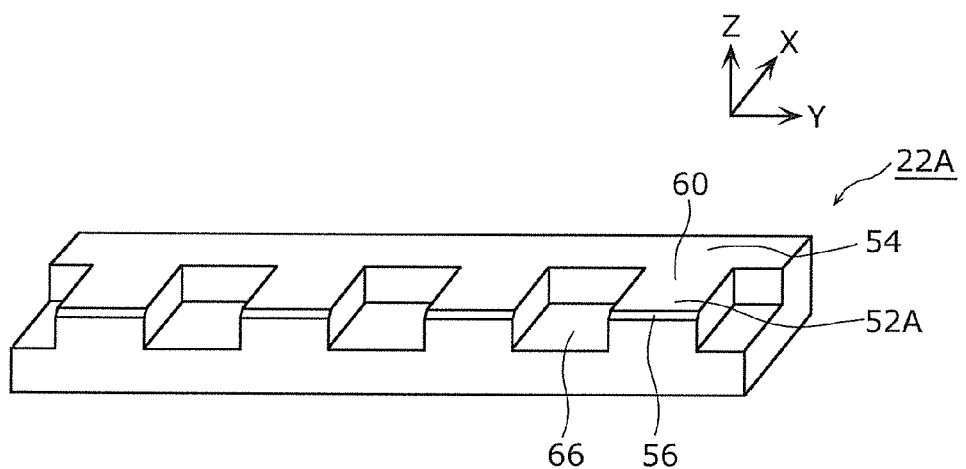
FIG. 9 is a perspective view of the support component of the display apparatus according to Embodiment 2 of the present invention.

Next, the structure of the display apparatus according to Embodiment 2 of the present invention will be described with reference to FIG. 9. FIG. 9 is a perspective view of the support component of the display apparatus according to Embodiment 2 of the present invention. It should be noted that in each of the following embodiments, the structural elements that are the same as in Embodiment 1 have the same reference numerals as in Embodiment 1. As such, descriptions thereof are omitted.

With the support component 22 according to Embodiment 1, the first support members 52 are completely separated from each other in the Y axis direction, but with a support component 22A according to Embodiment 2, first support members 52A are connected in the Y axis direction. In other words, a plurality of recesses 66 spaced apart from each other in the Y axis direction are formed in the end portion of the support component 22A facing the LED bar 18, and the first support members 52A are each formed between two adjacent recesses 66.

As such, it is possible to achieve the same advantageous effects of Embodiment 1 with the structure according to Embodiment 2.

Embodiment 3

Figure 10:
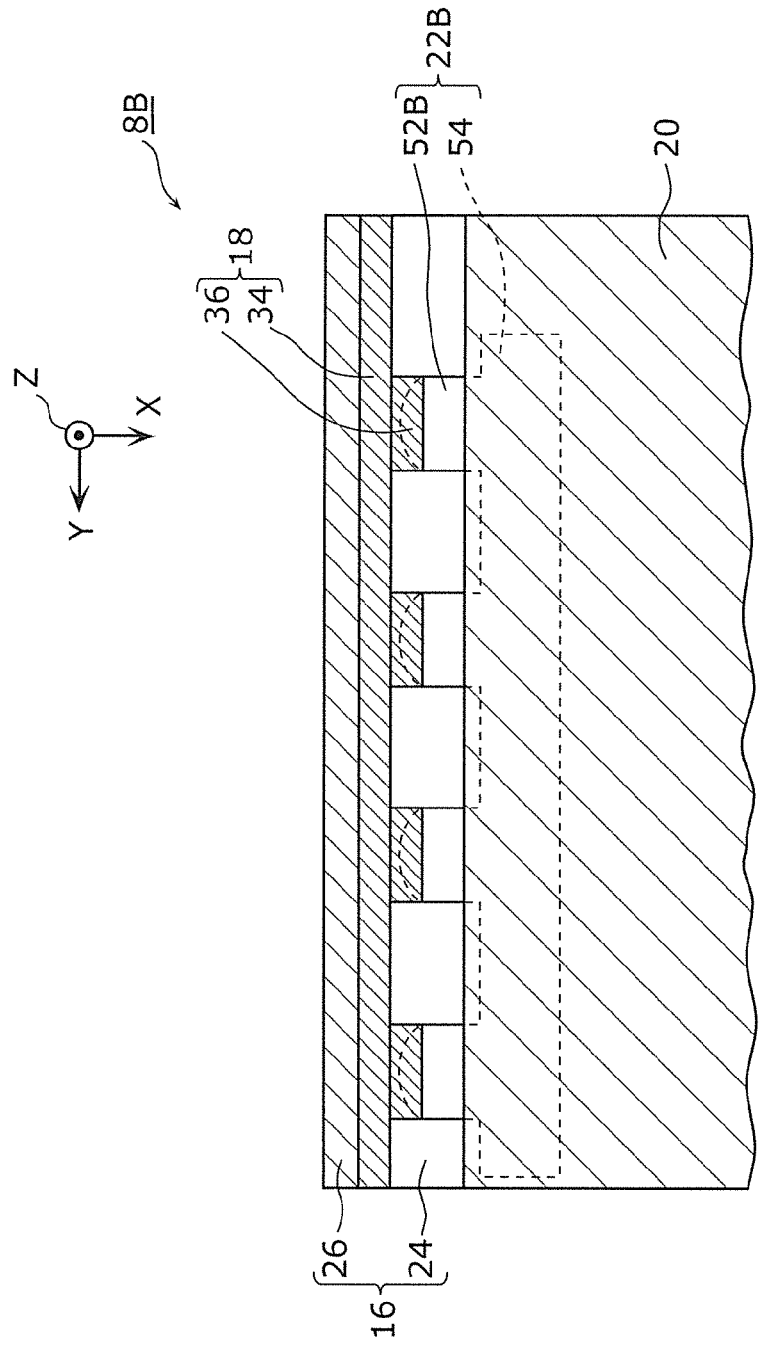
FIG. 10 is a cross section illustrating relevant components in the backlight unit of the display apparatus according to Embodiment 3 of the present invention.

Next, the structure of the display apparatus according to Embodiment 3 of the present invention will be described with reference to FIG. 10. FIG. 10 is a cross section illustrating relevant components in the backlight unit of the display apparatus according to Embodiment 3 of the present invention.

In a support component 22B of a backlight unit 8B according to Embodiment 3, an end surface of each of first support members 52B that faces the wiring substrate 34 has a convex surface. This reduces the contact surface area of the LEDs 36 and the first support member 52B to a smaller surface area than in Embodiment 1. This in turn makes it possible to minimize the frictional force acting between the LEDs 36 and the first support member 52B when the support component 22B is slid from the first position to the second position. As a result, it is possible to minimize the shear stress on the soldered portion 58 between the LEDs 36 and the wiring substrate 34 resulting from the frictional force.

Embodiment 4

Figure 11:
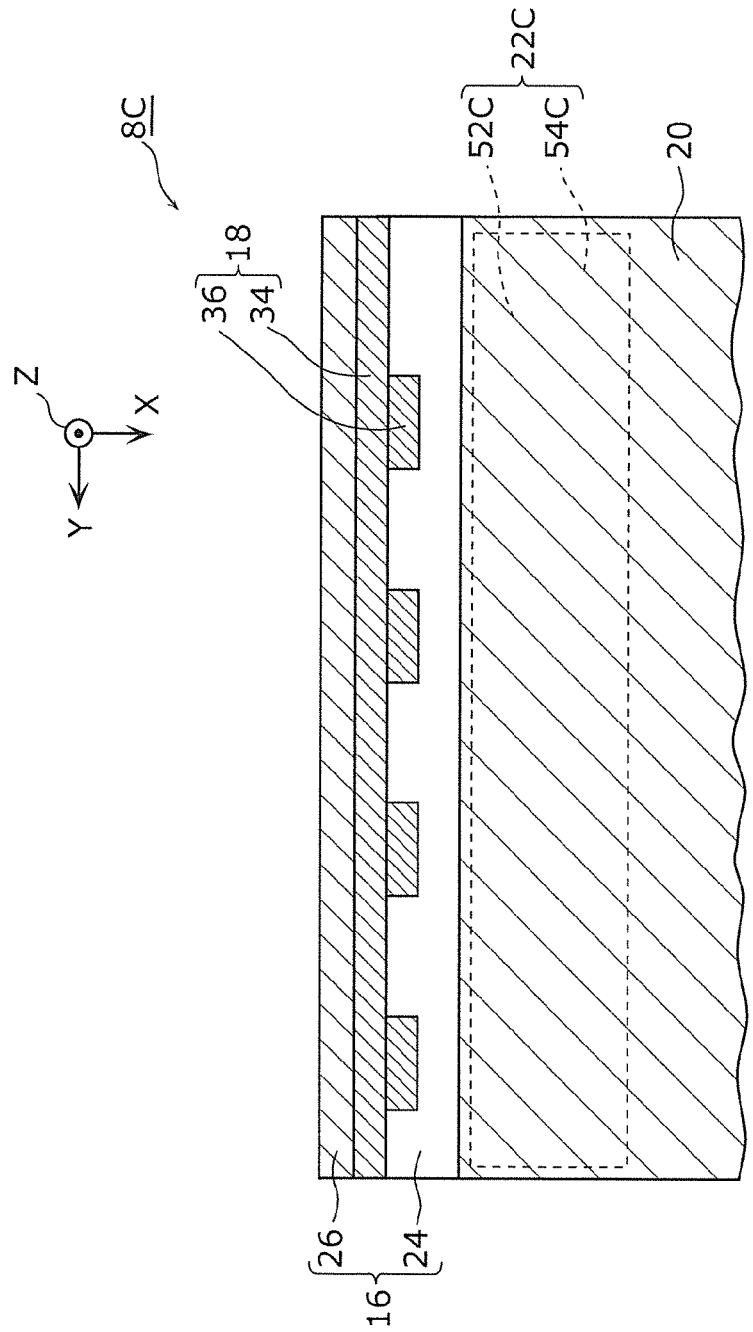
FIG. 11 is a cross section illustrating relevant components in the backlight unit of the display apparatus according to Embodiment 4 of the present invention, while the support component is at the second position.
Figure 12:
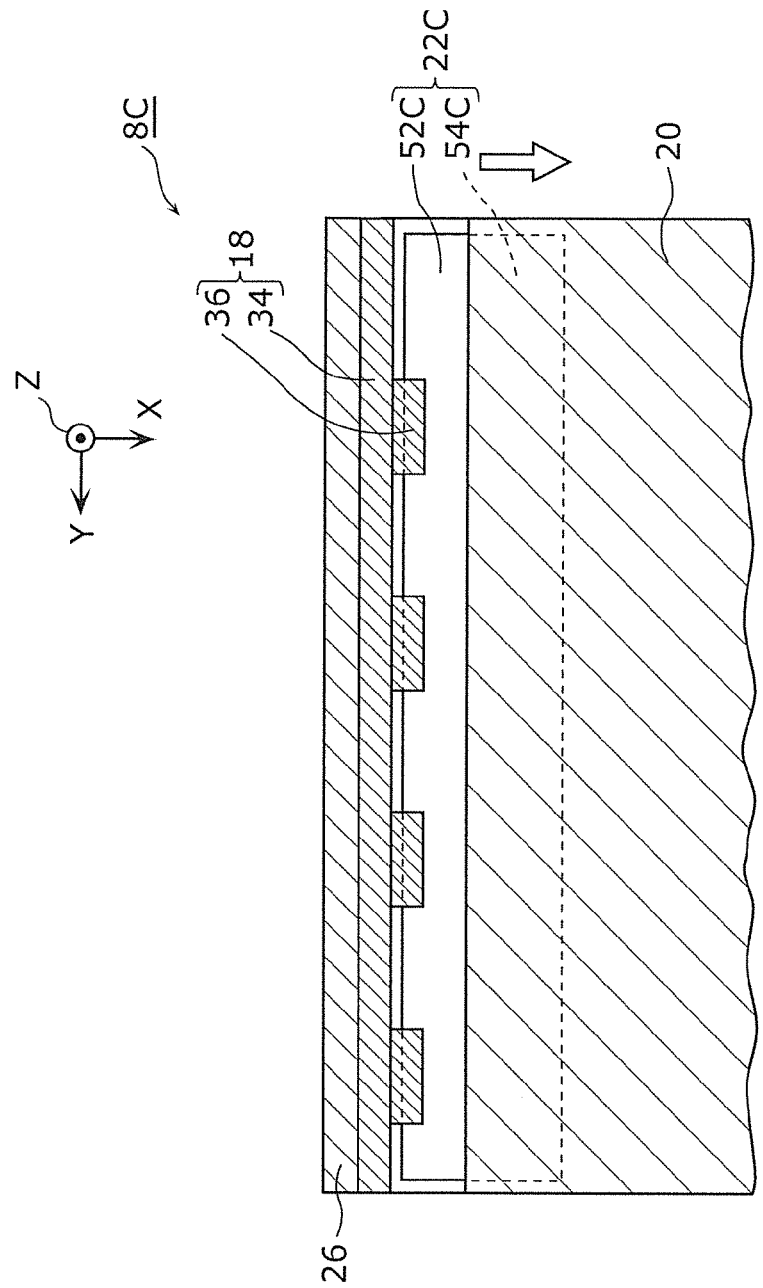
FIG. 12 is a cross section illustrating relevant components in the backlight unit of the display apparatus according to Embodiment 4 of the present invention, while the support component is at the first position.
Figure 13:
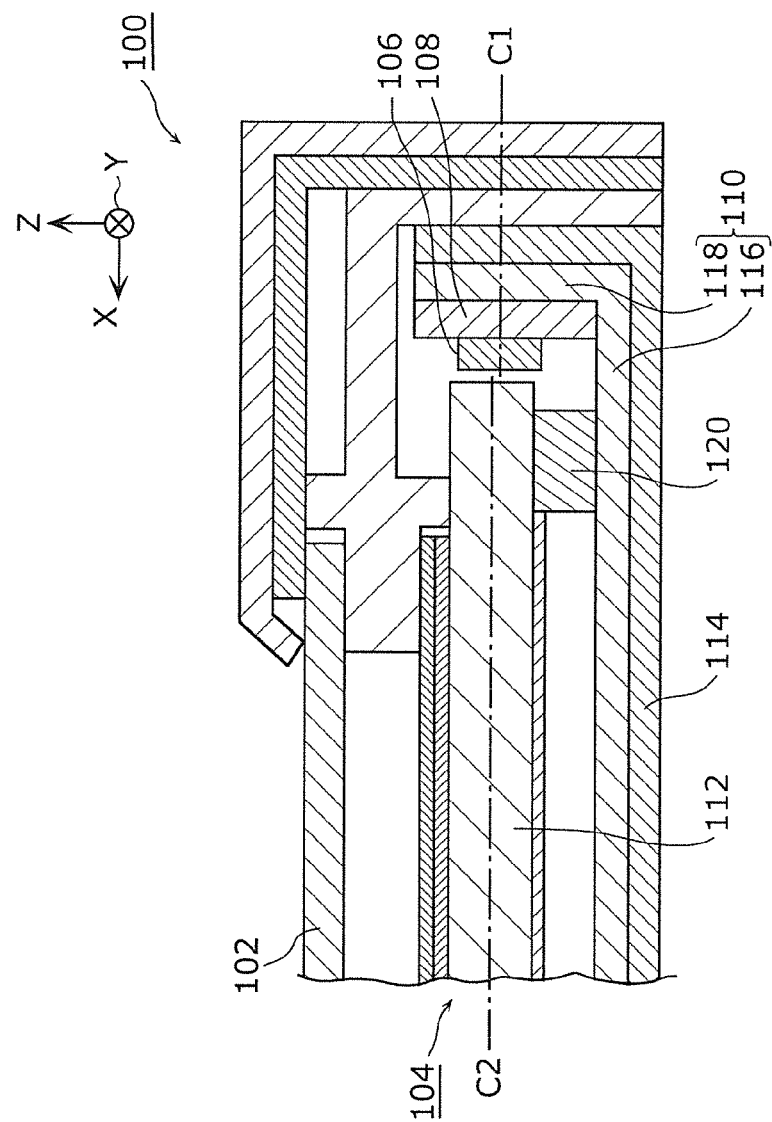
FIG. 13 is a cross section illustrating relevant components in a conventional display apparatus equipped with an edge-lit backlight unit.
Figure 14:
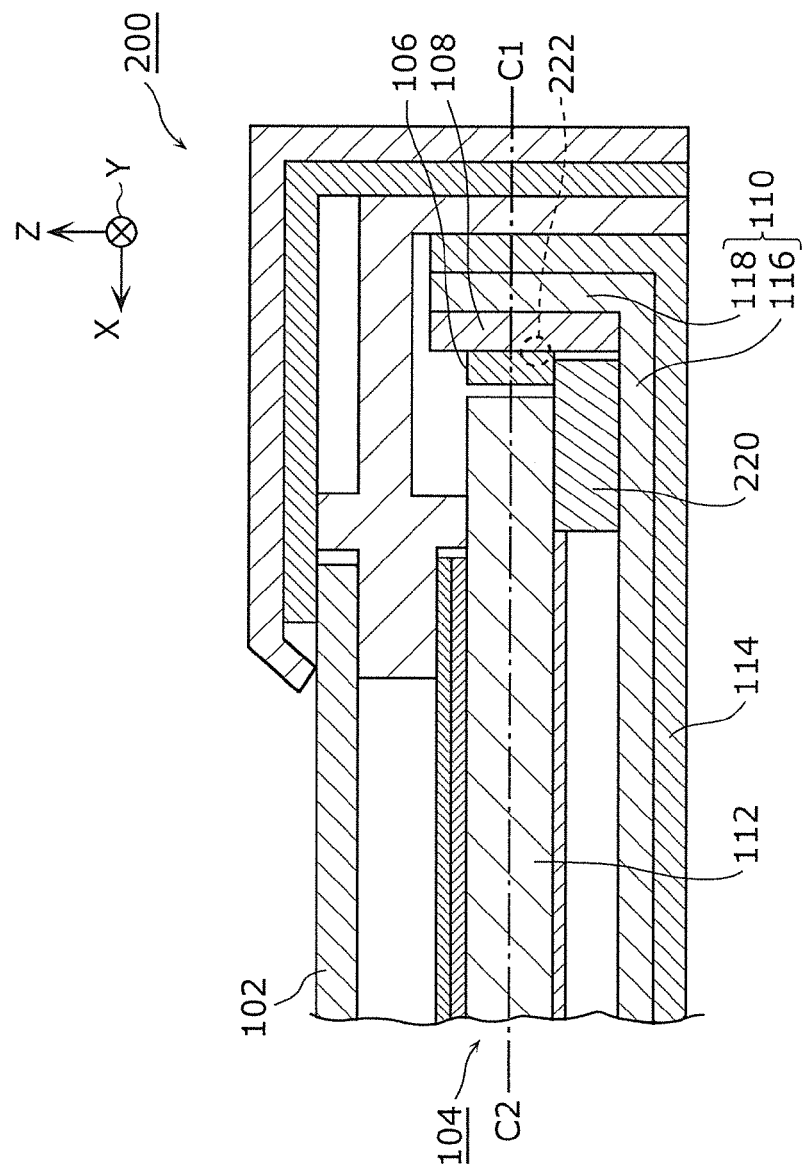
FIG. 14 FIG. 14 is a cross section illustrating relevant components in the display apparatus according to the comparative example equipped with an edge-lit backlight unit.

Next, the structure of the display apparatus according to Embodiment 4 of the present invention will be described with reference to FIG. 11 and FIG. 12. FIG. 11 is a cross section illustrating relevant components in the display apparatus according to Embodiment 4 of the present invention, while the support component is at the second position. FIG. 12 is a cross section illustrating relevant components in the display apparatus according to Embodiment 4 of the present invention, while the support component is at the first position.

A support component 22C of a backlight unit 8C according to Embodiment 4 has an elongated plate-like shape that extends in the Y axis direction. The end portion of the support component 22C toward the LEDs 36 is a first support member 52C. The end portion of the support component 22C toward the light guide plate 20 is a second support member 54C. The support component 22C is able to slide in a straight line between the first position and the second position in a direction substantially perpendicular to the arrangement direction of the LEDs 36 (in other words, in the X axis direction).

It should be noted that Embodiment 4 is provided with the moving mechanism described in Embodiment 1 as well. However, in Embodiment 4, each slot extends in a straight line in a direction substantially perpendicular to the arrangement direction of the LEDs 36.

As is illustrated in FIG. 11, while the support component 22C is at the second position, the first support member 52C is apart from the LEDs 36 and the second support member 54C supports the light guide plate 20. It should be noted that in Embodiment 4, the state in which the first support member 52C is apart from the LEDs 36 is a state in which the first support member 52C is positioned beneath the light guide plate 20.

As is illustrated in FIG. 12, while the support component 22C is at the first position, the first support member 52C supports the LEDs 36 and the second support member 54C supports the light guide plate 20.

As such, it is possible to achieve the same advantageous effects of Embodiment 1 with the structure according to Embodiment 4.

The display apparatus and the optical axis adjustment method for the display apparatus according to Embodiments 1 through 4 of the present invention has hereinbefore been described, but the present invention is not limited to these embodiments. For example, the above embodiments may be arbitrarily combined.

In Embodiments 1 through 4, the display apparatus is exemplified as a liquid crystal television receiver, but the display apparatus may be, for example, a liquid crystal monitor for a computer.

In Embodiments 1 and 2, a portion of the edge portion is chamfered, but the whole edge portion may be chamfered. Alternatively, instead of the edge portion being chamfered, at least a portion of the edge portion may be rounded (have a convex, curved surface).

In Embodiments 1 through 4, the wiring substrate is attached to the attachment portion with double sided tape, but the wiring substrate may be attached to the attachment portion with a screw.

In Embodiments 1 through 4, the support component is secured to the heat dissipation portion with screws, but the following configuration may be used. The slots may gradually narrow in width from a first end portion to a second end portion thereof in the X axis direction. With this configuration, the protrusion is pinched by the slot and deforms when it moves from the first end portion to the second end portion of the slot. As such, sliding the support component from the first position to the second position secures the heat dissipation portion while the support component is at the second position.

In Embodiments 1 through 4, as the moving mechanism for moving the support component, the support component includes a pair of protrusions and the heat dissipation portion includes a pair of slots, but conversely the support component may include a pair of slot and the heat dissipation portion may include a pair of protrusions. It should be noted that the type of moving mechanism is not limited to this example; various types may be used.

In Embodiments 1 through 4, the LEDs are chip-type LEDs, but this example is not limiting. Other types of LEDs may be used.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The display apparatus according to the present invention is applicable as, for example, a liquid crystal television receiver or a computer liquid crystal monitor.

The invention claimed is:

1. A display apparatus comprising:
a display panel; and
a backlight unit that emits light toward a back surface of the display panel,
wherein the backlight unit includes:
a light source that generates the light;
a wiring substrate having the light source mounted thereon;
a light guide plate including a side surface through which the light generated by the light source enters and a main surface through which the light entering through the side surface exits toward the back surface of the display panel; and
a support component including a first support member that supports the light source to position an optical axis of the light source and a second support member that supports the light guide plate to position an optical axis of the light guide plate, and
the support component is able to move between (i) a first position at which the first support member supports the light source and the second support member supports the light guide plate and (ii) a second position at which the first support member is apart from the light source and the second support member supports the light guide plate.

2. The display apparatus according to claim 1,
wherein the light source includes a plurality of light sources,
the light sources are arranged spaced apart from each other in a lengthwise direction of the wiring substrate,
the first support member includes a plurality of first support members, each corresponding to a different one of the light sources,
the support component is able to move between the first position and the second position in a direction substantially parallel to an arrangement direction of the light sources, and
each of the first support members is positioned between two adjacent ones of the light sources when the support component is at the second position.

3. The display apparatus according to claim 2,
wherein an end surface of each of the first support members that faces the wiring substrate is a convex surface.

4. The display apparatus according to claim 2,
wherein a reflective surface that reflects the light is formed on a surface of each of the first support members that supports the light source.

5. The display apparatus according to claim 1,
wherein the light source includes a plurality of light sources,
the light sources are arranged spaced apart from each other in a lengthwise direction of the wiring substrate,
the first support member is a portion of the support component that is an end portion toward the light sources,
the second support member is a portion of the support component that is an end portion toward the light guide plate, and
the support component is able to move between the first position and the second position in a direction substantially perpendicular to an arrangement direction of the light sources.

6. The display apparatus according to claim 1,
wherein at least a portion of an edge portion of a surface of the first support member that supports the light source is chamfered or rounded.

7. An optical axis adjustment method for a display apparatus including:
a display panel; and
a backlight unit that emits light toward a back surface of the display panel,
the backlight unit including:
a light source that generates the light;
a wiring substrate having the light source mounted thereon; and
a light guide plate including a side surface through which the light generated by the light source enters and a main surface through which the light entering through the side surface exits toward the back surface of the display panel,
the optical axis adjustment method comprising:
positioning, at a first position, a support component including a first support member and a second support member;
positioning an optical axis of the light source by supporting the light source with the first support member while the support component is at the first position;
moving the support component from the first position to a second position different from the first position to separate the first support member from the light source; and
positioning an optical axis of the light guide plate by supporting the light guide plate with the second support member while the support component is at the first position or the second position.

\* \* \* \* \*